July 7, 1959
P. A. NOXON
2,893,662
AUTOMATIC PILOT SYSTEM
Filed Dec. 18, 1953
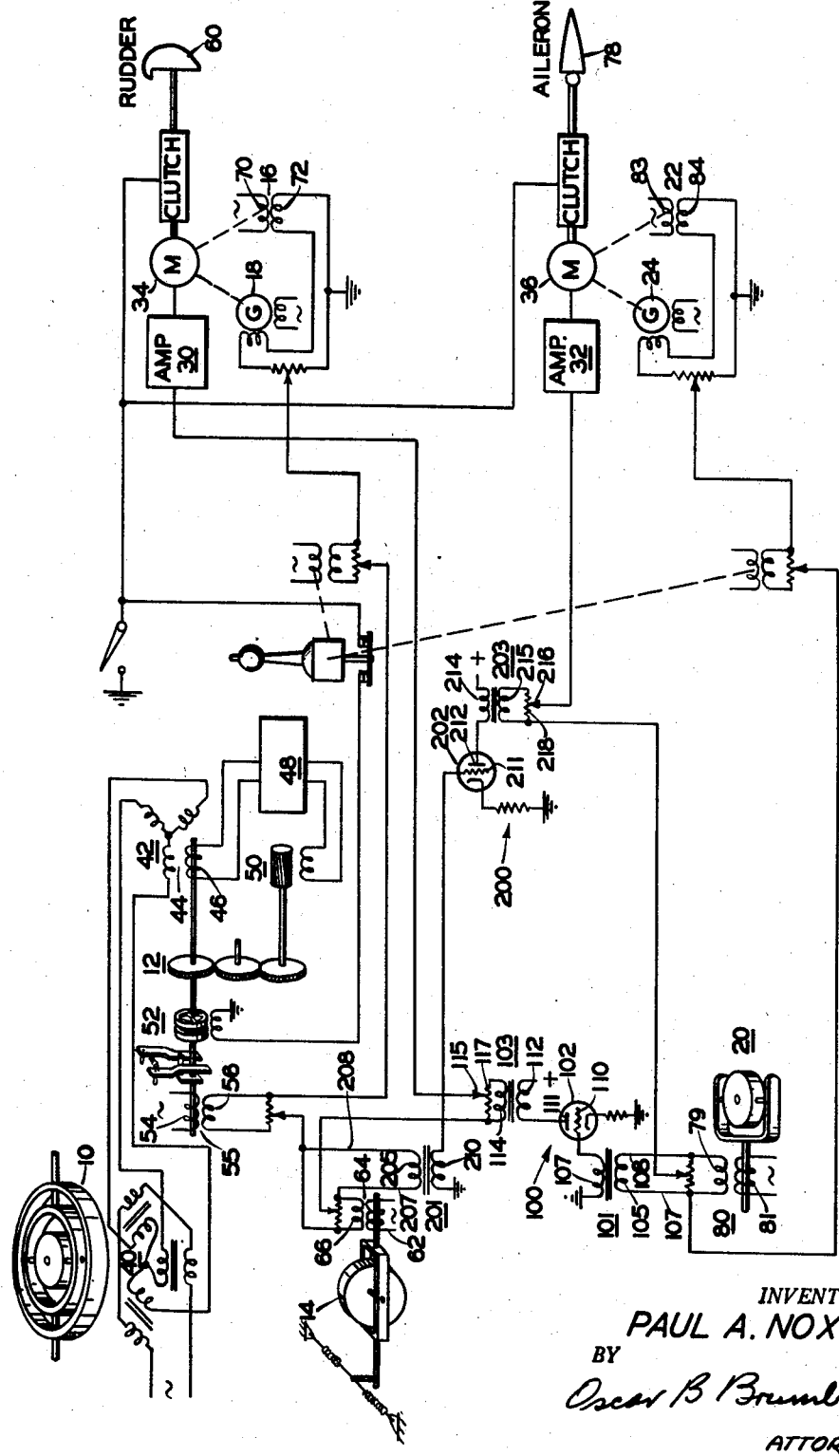
INVENTOR.
PAUL A. NOXON
BY
Oscar B. Brumback
ATTORNEY United States Patent Office 2,893,662
Patented July 7, 1959

2,893,662

AUTOMATIC PILOT SYSTEM

Paul A. Noxon, Tenafly, N.J., assignor to Bendix Aviation Corporation, Teterboro, N.J., a corporation of Delaware Application December 18, 1953, Serial No. 399,107

13 Claims. (Cl. 244—77)

The present invention relates generally to the control of aircraft and more particularly to the control of an aircraft about its roll and yaw axis.

A force applied to a body at some distance from its center of gravity tends to rotate the body about its center of gravity. This tendency which is known as a moment and depends upon the magnitude of the force and the distance of its line of application is used to control an aircraft in flight by rotating it about its center of gravity. To do this, a control surface is displaced through an angle proportional to the departure of the craft from a reference position about its axis, and the pressure exerted by the relative wind on the displaced surface applies a turning movement about the center of gravity of the craft.

The sum of all the moments about an axis at the center of gravity determines the direction of rotation of a craft about that axis. In general, this sum is comprised of: the moment due to the inertia of the craft; the moment due to the aerodynamic damping produced by the particular design of the craft; and a restoring moment due in part to the static stability of the craft and in part to manual or automatic control. The moments are normally balanced, so no rotation of the craft takes place.

When an external force, such as a gust, angularly displaces the craft about an axis, the restoring moment immediately seeks to return the craft to its initial position. This moment, however, tends to overcompensate for the displacement; the craft passes beyond its initial position, and a restoring moment is set up in the opposite direction. This results in oscillation. The restoring action about each of the axis of the craft varies; so, the period of oscillation about each axis differs.

A coupling effect exists in an aircraft between the actions of the craft about its yaw and roll axes so that a yawing moment develops whenever the craft departs from its level roll attitude and a rolling moment develops whenever the craft attains an angular velocity about its yaw axis. Therefore, a disturbance which develops a moment to produce a departure of the craft from its reference attitude in roll causes a yawing moment to develop. This moment develops a yawing velocity which couples back to roll and produces a rolling moment in the same direction as the original disturbance; the additional rolling moment producing a greater departure of the craft in roll than the magnitude of the original disturbance would warrant. Similarly, a disturbance which produces a yawing moment to cause the craft to develop a yaw velocity also produces a rolling moment, and the resulting departure of the craft from its roll reference produces an additional yawing moment in the same direction as the moment caused by the original disturbance. Consequently, a craft experiences a greater departure from its reference in yaw than is warranted by the original disturbance.

Heretofore, control systems have considered the yaw axis control channel of the aircraft and the roll axis control channel as two separate and independent control channels: rudder displacement being applied as a function disturbance of the aircraft about its yaw axis and aileron displacement as a function of a disturbance about its roll axis. Such systems presented the disadvantage that securing a satisfactory damping action was difficult since the oscillations about each axis may have widely differing natural frequencies. Accordingly, the adjustments in such automatic control system that are necessary for satisfactory damping action are frequently not those adjustments which would give optimum performance if the two systems could be treated as completely independent.

An object of the invention, therefore, is to provide a novel apparatus and method for overcoming the action on the aircraft about one of its axes caused by action about another axis.

A further object is to improve the performance of aircraft control systems by providing a novel arrangement to nullify the action on one of the system's channels controlling movement of the craft about one axis that results from movement of the craft about another of its axes.

The invention contemplates a novel means and method for an automatic pilot system for applying coupling actions from roll to yaw and from yaw to roll that are equal and opposite to those naturally existent in the aircraft so that the coupling action cancels out, and complete independence can be established between the two control channels of the system.

The above and other advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not designed as a definition of the limits of the invention.

The single sheet of drawing illustrates a schematic diagram of an automatic pilot system in which the novel decoupling arrangement of the present invention is employed.

The novel arrangement for overcoming the coupling effect that exists between the yaw and roll axes of aircraft is illustrated in operative association with an automatic pilot system which may be generally of the type described in my U.S. Patent No. 2,625,348, issued January 13, 1953. For purposes of simplicity in explanation, the yaw and roll control channels only of the automatic pilot system are illustrated.

Each control channel consists generally of a series of reference sensing devices, an amplifier, and a servomotor. The reference devices for the yaw channel of the embodiment herein are comprised of: an earth inductor compass 10, a master direction indicator 12, a rate of turn gyro 14, a follow-up device 16, and a rate generator 18. The reference devices for the roll control channel are comprised of: a vertical gyro 20, a follow-up device 22 and a rate generator 24. The amplifiers 30 and 32 and the servomotors 34 and 36 of the two channels may be identical and of conventional type: the amplifiers amplifying the low signal voltage level to a level sufficient to energize the variable phase winding of a servomotor whose fixed phase winding is continuously energized.

Referring now to the yaw control channel, a pick-up device 40 in the earth inductor compass senses changes in heading due to the change in the craft's position in the earth's magnetic field and transmits a signal to the stator 42 of an inductive device 44 in the master direction indicator 12. This sets up a directional field in the stator. When the motor 46 of inductive device 44 is displaced from a null position with respect to this stator field, a corresponding signal is developed in the rotor and is applied to amplifier 48. Here the signal is amplified to operate a servomotor 50 to drive rotor 46 to a null position.

When magnetic clutch 52 is engaged, motor 58 displaces the rotor 54 of an inductive device 55 from a null position relative to a stator 56 to develop a signal corresponding in amplitude and phase to the amount and direction of the deviation of the craft from a desired heading. This signal actuates servomotor 34 to displace the rudder 60 to apply the right amount of corrective control.

Due to the inertia of the plane about the yaw axis, the rate of deviation as well as the extent of deviation must be taken into consideration to avoid hunting. The rate at which the craft is turning is sensed by the conventional rate gyro 14 which displaces the rotor 62 of an inductive device 64 an amount corresponding to the rate of turning. The signal developed in stator 66 corresponds in amplitude and phase to the rate and direction of the turning. Thus, if the aircraft turns rapidly about its yaw axis, a signal of large amplitude develops to displace the rudder to damp the movement.

The follow-up device 16 insures that the amount of rudder deflection will correspond to the amplitude of the control signal. As the shaft of servomotor 34 turns, it displaces the rotor 70 of the follow-up inductive device to develop a corresponding signal in stator 72. This signal, being in phase opposition to the control signal causing the motor operation, reduces and finally cancels the control signal, and the motor stops with the surface displaced an amount corresponding to the amplitude of the control signal.

The inertia of the motor must also be taken into consideration. Accordingly, a conventional rate generator 18 is driven as the motor shaft turns to develop a signal corresponding in amplitude and phase to the rate and direction of motor operation.

The foregoing signals are connected in series and applied to servoamplifier 30 where they are amplified and applied to the fixed phase winding of servomotor 34. Depending upon the phase of the reference signal to the servoamplifier, the servomotor will be driven in a clockwise or counterclockwise direction to displace the rudder to stabilize the craft about its yaw axis.

Turning now to the roll axis, the attitude reference device for aileron control is vertical gyro 20 which, due to characteristics of gyroscopic inertia, remains upright regardless of the movements of the aircraft. If the craft is thrown off the reference attitude, a signal corresponding in phase and amplitude to the direction and extent of the displacement is developed in the stator 79 of an inductive device 80 whose rotor 81 is mechanically connected to a trunnion of the vertical gyro. The signal is amplified in servoamplifier 32 and energizes the variable phase winding of servomotor 36. Depending upon the phase of the signal, the servomotor turns in a clockwise or counterclockwise direction.

As the shaft of motor 36 turns, the rotor 83 of the aileron follow-up device 22 is displaced and a follow-up signal builds up in stator 84. At the same time, the rotor of the rate generator 24 is turned developing a rate signal. These signals, being opposite in phase to the attitude signal and connected in series with the attitude signal, reduce and finally cancel the attitude reference signal. The net signal is zero; the motor stops; and the ailerons are displaced by an amount which is proportional to the extent as well as the direction of displacement of the craft from the established reference attitude.

The system so far described is known in the art; and while it works well, it does have the disadvantages mentioned before; namely, that no correction is made for the coupling effects that exist between the roll and yaw axes on the two control channels. Consequently, the control action about the two axes is not as satisfactory as the control action that could be maintained were the two systems completely independent of movement of the craft about the roll and yaw axes. In accordance with the present invention, the decoupling or overcoming of these coupling effects is achieved so that the action of each control is substantially independent of the other.

When the craft experiences a roll action, it also tends to experience an action in yaw because of the coupling which exists between the movement of the craft about the two axes. In the novel arrangement of the present invention, a signal corresponding to the roll action is transferred to the yaw control channel to actuate the rudder to oppose the action about the yaw axis. In order that no transfer from the yaw control channel to the roll control channel takes place, this is accomplished by a buffer amplifier system 100 which is comprised generally of a coupling transformer 101, an isolation amplifier 102 and a coupling transformer 103. Coupling transformer 101 has its primary winding 105 connected by leads 107 and 108 across the stator winding 79 of inductive device 80 and its secondary winding 107 connected to the grid 110 of isolation tube 102. The plate 111 of tube 102 is connected to the primary winding 112 of coupling transformer 103 whose secondary winding 114 is connected into the yaw control channel signal chain. The adjustment of the wiper 115 of potentiometer 117 across secondary winding 114 adjusts the signal to the level required. This decouples the roll to yaw action.

To introduce a signal corresponding to the action about the yaw axis to the roll control channel to overcome the naturally existent coupling action from yaw to roll, there is provided a second buffer amplifier system 200, which is comprised generally of a coupling transformer 201, an isolation tube 202 and a coupling transformer 203. Coupling transformer 201 has its primary winding 205 connected by leads 207 and 208 to the stator 66 of the inductive device 64 which is actuated by the rate of turn gyro 14 and its secondary winding 210 connected to the grid 211 of amplifier 202. The plate 212 of amplifier 202 is connected to the primary winding 214 of the coupling transformer 203 whose secondary winding 215 is connected into the signal chain of the roll control channel. By adjusting the wiper 216 of potentiometer 218, the signal may be adjusted to the desired level.

In operation, when a disturbance imparts a rolling action to the craft, the rolling action causes a yawing moment to develop which tends to cause the craft to develop a yawing velocity. In accordance with the present invention, the displacement in roll causes relative displacement of rotor 81 and stator 79 of inductive device 81 developing a bank attitude signal whose amplitude is proportional to the angle of the displacement and whose phase is determined by its direction, right or left. This signal is fed to the aileron servomotor 36 to correct the bank condition, and also by way of leads 107 and 108 is coupled across coupling transformer 101 to the grid 110 of isolation tube 102. The amplified signal from plate 112 is coupled across coupling transformer 103 to potentiometer 117 where its initial value is adjusted by wiper 115. The signal is applied to servomotor 34 to displace rudder 60 sufficiently to develop a moment which is in opposition to the moment about the yaw axis which is developed by the disturbance about the roll axis. The moments are balanced, and no yawing velocity develops. Thus, the novel arrangement of the present invention has decoupled the inherent roll axis to yaw axis coupling action, making the two channels of control substantially independent.

In a similar manner, a decoupling of the inherent yaw axis to roll axis coupling action is accomplished. The angular velocity of the craft about the yaw axis is sensed by the rate of turn gyro 14, causing a relative displacement of rotor 62 and stator 66 of inductive device 64.

This develops a signal corresponding in amplitude to the angular velocity and in phase to the direction of the angular velocity. The signal is fed to servomotor 34 to actuate rudder 63 to correct for the angular velocity and is also coupled across transformer 201 to the grid 211 of isolation tube 202. The amplified signal from plate 212 is coupled across transformer 203 to potentiometer 218 where its value is adjusted by wiper 216. This signal is applied to servomotor 36 to displace the ailerons 78 to develop a moment about the roll axis.

As the craft develops a yaw velocity, a moment due to the inherent coupling action is developed about the roll axis. At the same time, a moment is developed by the signal from the buffer amplifier system 200 due to its displacement of the ailerons. These two moments are equal and opposite; therefor, no rolling action develops as a result of the yawing action, and the two channels are made substantially independent of movement of the craft about the roll and yaw axes.

The foregoing has presented a novel arrangement for overcoming the inherent coupling action that exists between the roll and yaw axes of an aircraft so that the two control channels are substantially independent, and the performance of both channels is extended. While either channel may be decoupled, a decoupling of both channels is required for optimum performance.

Although but one embodiment of the invention has been illustrated and described in detail, various changes and modifications in the form and relative arrangement of parts, which will now appear to those skilled in the art may be made without departing from the scope of the invention. Reference is therefore to be had to the appended claims for a definition of the limits of the invention.

I claim:

1. In a steering apparatus for aircraft having aileron and a rudder surfaces, a roll control channel for the craft including means for producing a control effect on the aileron surfaces in response to the extent of deviation of said aircraft from a predetermined angular position with respect to the roll axis, a yaw control channel for the craft including means for producing a control effect on the rudder surfaces in response to the rate of deviation of said aircraft from a predetermined angular position with respect to the yaw axis, and means connected with each control effect producing means for inserting a portion of the control effect from one channel to the other channel to give an action on the craft that is equal and opposite to the action normally experienced by the craft about one axis as a result of the action of the aircraft about the other axis.

2. Apparatus for decoupling the inherent coupling effects in the steering apparatus for an aircraft having aileron and rudder surfaces for controlling the aircraft about the roll and yaw axes, a roll control channel including a servomotor for moving the aileron surface and means for producing a control signal for said aileron servomotor in response to the extent of deviation of said aircraft from a predetermined position about the roll axis, a yaw control channel including a servomotor for moving the rudder surface and means for producing a control signal for said rudder servomotor in response to the rate of angular deviation of said aircraft from a predetermined position about the yaw axis, and means connected with each signal producing means for transmitting a portion of the signal from one channel to the other channel to overcome the control effect exerted on the craft about one axis by the movement of the aircraft with respect to the other axis whereby the control action about one axis becomes independent of the control action about the other axis, said last named means including isolation means so that said transmission from one channel to the other is unidirectional for each signal producing means.

3. Apparatus for overcoming the inherent coupling effect between the roll and yaw axis of an aircraft due to the movement of the craft about one axis affecting the other, comprising means responsive to the rate of movement of the craft about the yaw axis for applying a moment on the aircraft about the roll axis that is equal and opposite to the moment exerted thereon by said movement about the yaw axis and gyro means responsive to the extent of movement of the craft about the roll axis for applying a moment on the aircraft about the yaw axis that is equal and opposite to the moment exerted thereon by said movement about the roll axis.

4. An automatic steering system for an aircraft, comprising a servomotor for operating the rudder of said craft, yaw reference means responsive to the rate of turning of said craft for actuating said servomotor by a signal, roll reference gyro means for developing a signal corresponding to the roll attitude of said craft, and means connecting said roll reference means and the yaw reference means to said servomotor for actuating the latter by a summation of the signals.

5. A steering system for an aircraft, comprising first means for applying a moment of force about the yaw axis of the craft, second means for applying a moment of force about the roll axis of the craft, said craft being subject to the inherent development of a moment about its yaw axis during a displacement about its roll axis and to the development of a moment about its roll axis during a displacement about its yaw axis, means responsive to the extent of displacement of the craft from a predetermined position about its roll axis and connected with said first means for applying a moment about the yaw axis in opposition to said first mentioned inherent moment, and means responsive to the rate of displacement of the craft about its yaw axis and connected with said second means for applying a moment about the roll axis in opposition to said second mentioned inherent moment.

6. An automatic pilot system for an aircraft, comprising a servomotor connected to the rudder of said craft for applying a moment of force about its yaw axis, gyro reference means responsive to displacement of the craft about its roll axis, said craft being subject to the development of a moment about the yaw axis during displacement about the roll axis, and means connecting said reference means and said servomotor for operating the latter to apply a moment in opposition to said inherent moment.

7. Apparatus for overcoming the inherent coupling between the roll and yaw axes of an aircraft due to the movement of the craft about one axis affecting the other, comprising a servomotor for moving the aileron surface of said craft, control means for said aileron servomotor including a first signal device and means responsive to displacement of the craft from a predetermined attitude in roll for actuating said signal device to develop a corresponding attitude signal for said aileron servomotor, a servomotor for moving the rudder surface of said craft, control means for said rudder servomotor including a second signal device and means responsive to the rate of turning of the craft about its yaw axis for actuating said second signal device to develop a corresponding rate of turn signal for said rudder servomotor, means for transmitting said roll attitude signal to said rudder servomotor including means for adjusting the magnitude of said roll attitude signal, and means for transmitting said rate of turn signal to said aileron servomotor including means for adjusting the magnitude of said rate of turn signal.

8. A control system for an aircraft having a control surface operable to turn the craft about its yaw axis, comprising means for developing an electrical signal corresponding to the rate of movement of said craft about said yaw axis, gyro means for developing an electrical signal corresponding to the extent of movement of said craft about the roll axis, and an actuator responsive to said signals for operating said surface.

9. A control system for an aircraft having a movable yaw control surface, comprising means for developing an electrical signal corresponding to the extent of movement of said surface from a normal position, means for developing an electrical signal corresponding to the rate of movement of said craft about said yaw axis, gyro means for developing an electrical signal corresponding to the extent of movement of said craft from a normal position about the roll axis, and an actuator responsive to said signals for operating said surface.

10. A control system for an aircraft having a control surface operable to turn the craft about the yaw axis, comprising means for developing an electrical signal corresponding to the rate of movement of said craft about said yaw axis, gyro means for developing an electrical signal corresponding to the extent of movement of said craft about the roll axis, an actuator responsive to said signals for operating said surface, and means for developing a signal corresponding to the extent of operation of said surface to oppose said operation by said first two named signals.

11. A control system for an aircraft having movable rudder and aileron surfaces for controlling the craft about the yaw and roll axes respectively, comprising means for developing a first electrical signal corresponding to the rate of turn of the craft about the yaw axis, means for developing a second electrical signal corresponding to displacement of the craft from a predetermined attitude about the roll axis, an actuator responsive to a summation of said first and second signals for moving said rudder surface, and an actuator responsive to said second signal for moving said aileron surface.

12. A control system for an aircraft having movable rudder and aileron surfaces for coordinately controlling the craft about the yaw and roll axes respectively, comprising means for developing a first electrical signal corresponding to the rate of turn of the craft about the yaw axis, means for developing a second electrical signal corresponding to displacement of the craft from a predetermined attitude about the roll axis, an actuator responsive to a summation of said first and second signals for moving said rudder surface, and an actuator responsive to said second signal for moving said aileron surface, whereby the cross-feeding of the roll attitude electric signal to the rudder aids in coordinating the control of the craft.

13. In steering apparatus for aircraft having aileron and rudder surfaces for controlling the aircraft about the roll and yaw axes, means for developing a control signal for controlling the aileron surface in response to the extent of craft deviation from a predetermined attitude with respect to the roll axis, means for developing a control signal for controlling the rudder surface in response to the rate of craft deviation from a predetermined attitude with respect to the yaw axis, means for cross-feeding at least a portion of the attitude signal to control the rudder surface, and means for cross-feeding at least a portion of the yaw rate signal to control the aileron surface to cancel the coupling effect between the roll and yaw axes.

References Cited in the file of this patent

UNITED STATES PATENTS

| | | |
|---|---|---|
| 2,558,096 | Markuson | June 26, 1951 |
| 2,636,698 | Owen | Apr. 28, 1953 |
| 2,638,288 | Hanna | May 12, 1953 |
| 2,686,021 | Halpert | Aug. 10, 1954 |
| 2,705,116 | Yates et al. | Mar. 29, 1955 |